No. 846,316. PATENTED MAR. 5, 1907.
W. W. W. KEYES.
MACHINE FOR MAKING WINDOW OR PLATE GLASS.
APPLICATION FILED AUG. 24, 1903. RENEWED JUNE 21, 1906.
7 SHEETS—SHEET 1.
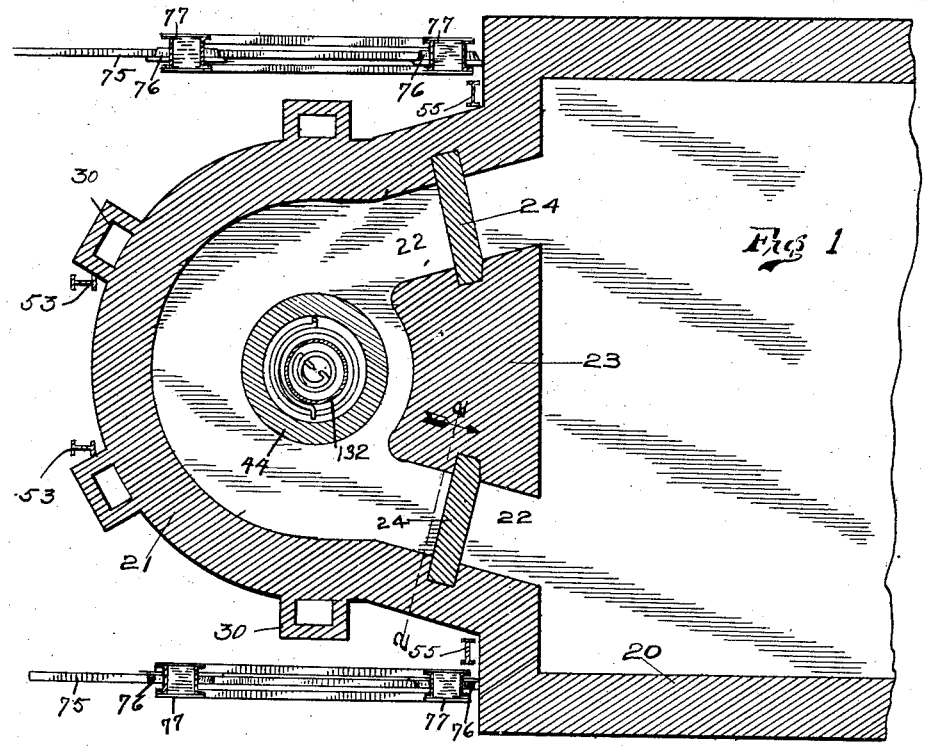
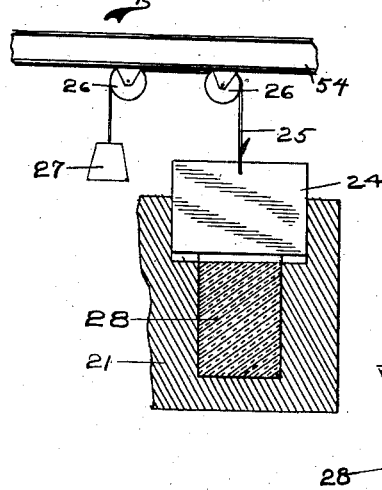
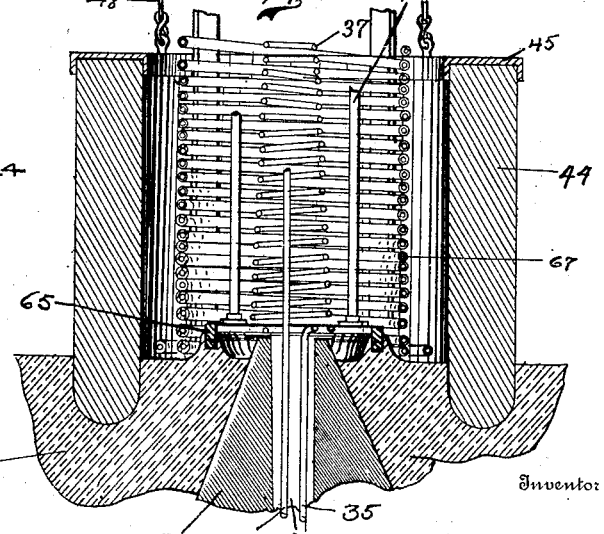
Witnesses
Grace M. Murphy
R. P. King
Inventor
Wm. W. W. Keyes
By V. H. Lockwood
His Attorney

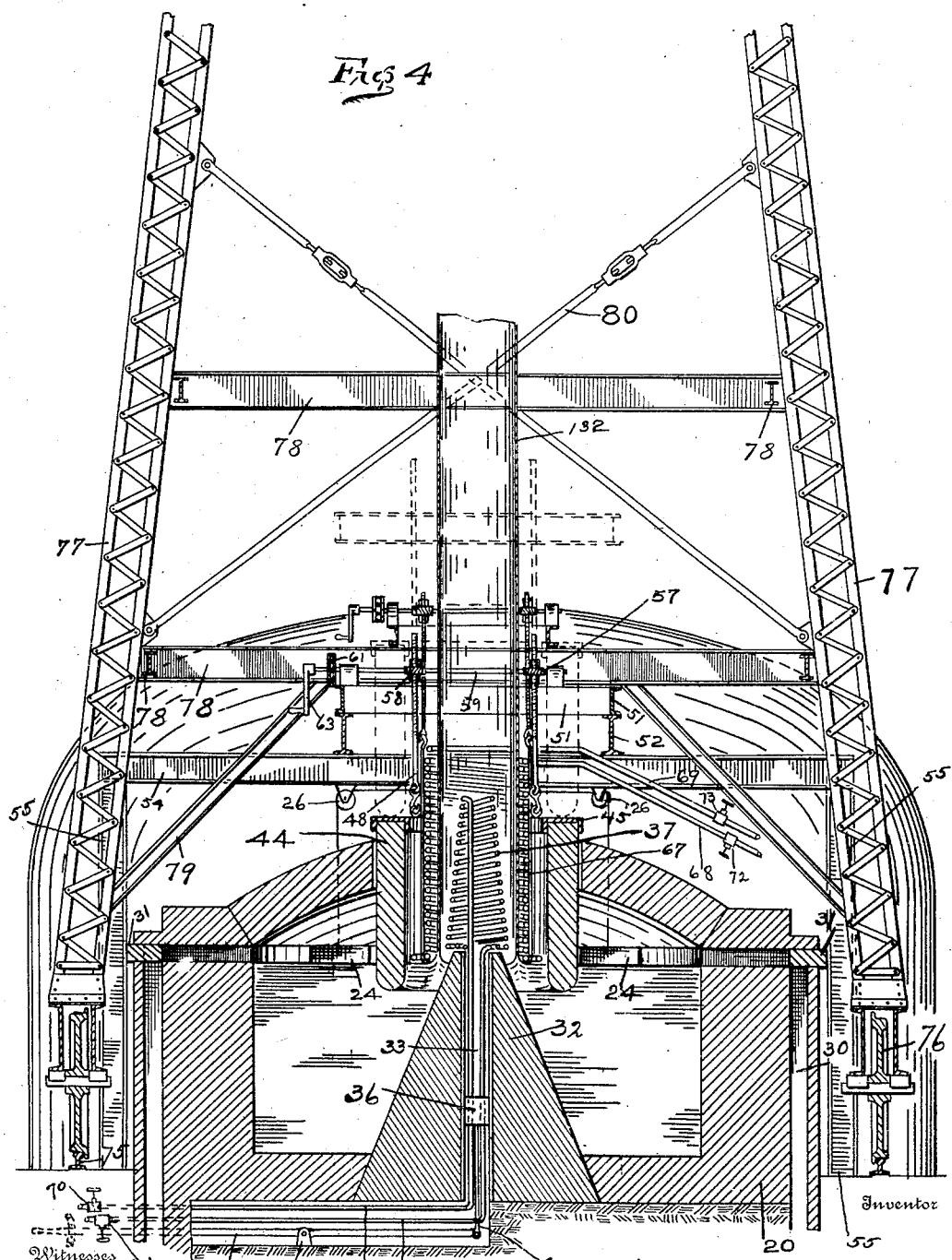

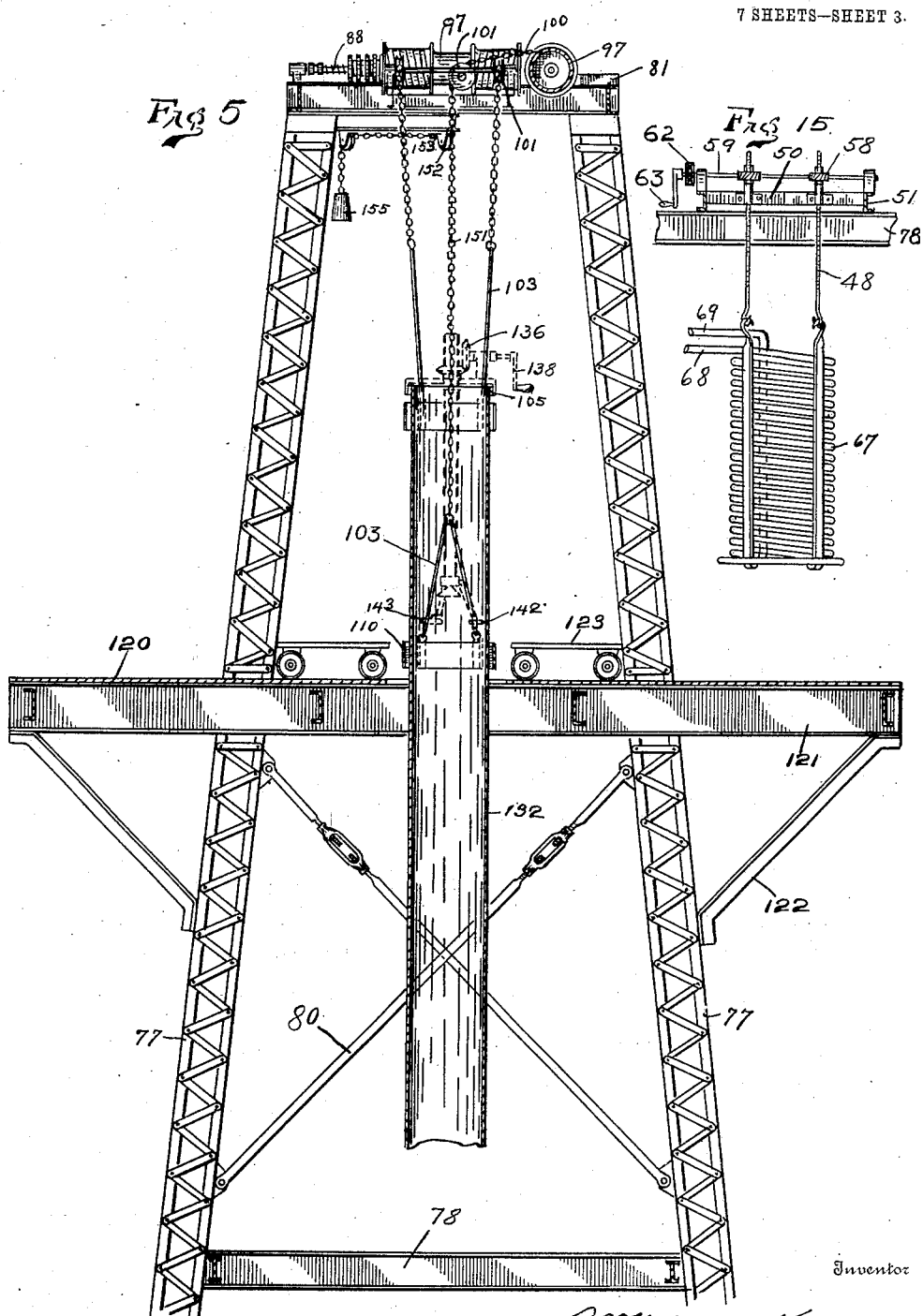

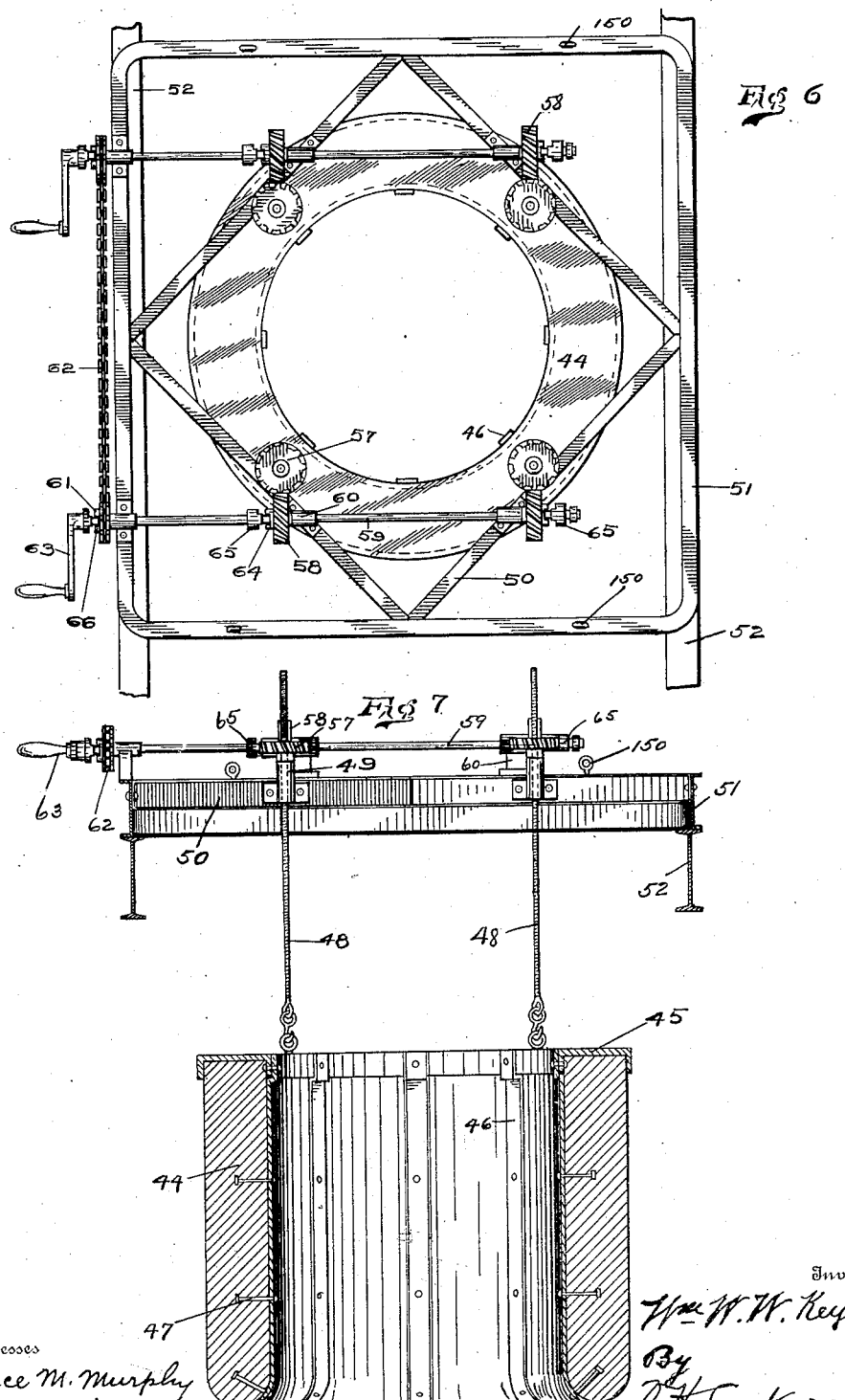

No. 846,316. PATENTED MAR. 5, 1907.
W. W. W. KEYES.
MACHINE FOR MAKING WINDOW OR PLATE GLASS.
APPLICATION FILED AUG. 24, 1903. RENEWED JUNE 21, 1906.
7 SHEETS—SHEET 5.
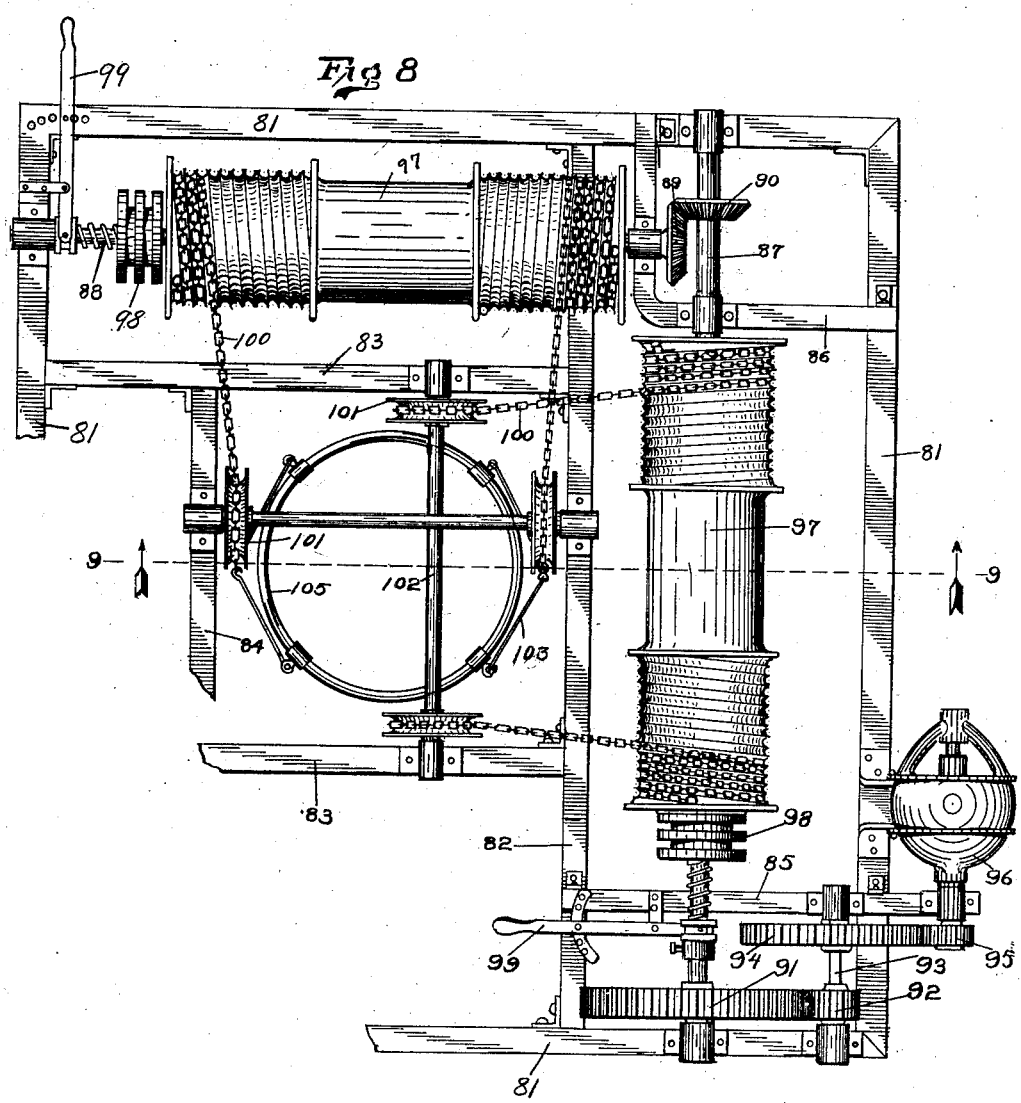

No. 846,316. PATENTED MAR. 5, 1907.
W. W. W. KEYES.
MACHINE FOR MAKING WINDOW OR PLATE GLASS.
APPLICATION FILED AUG. 24, 1903. RENEWED JUNE 21, 1906.
7 SHEETS—SHEET 6.
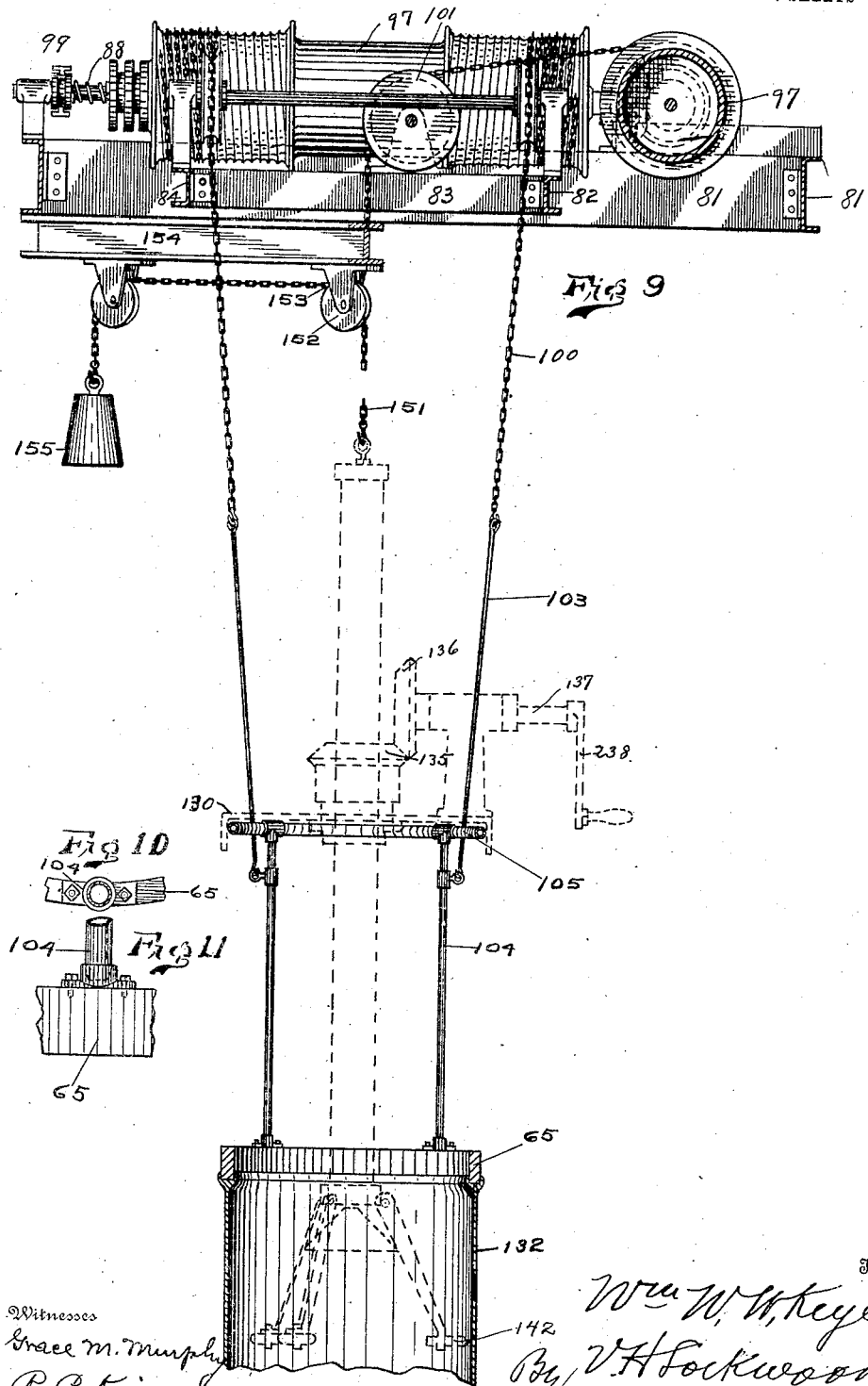

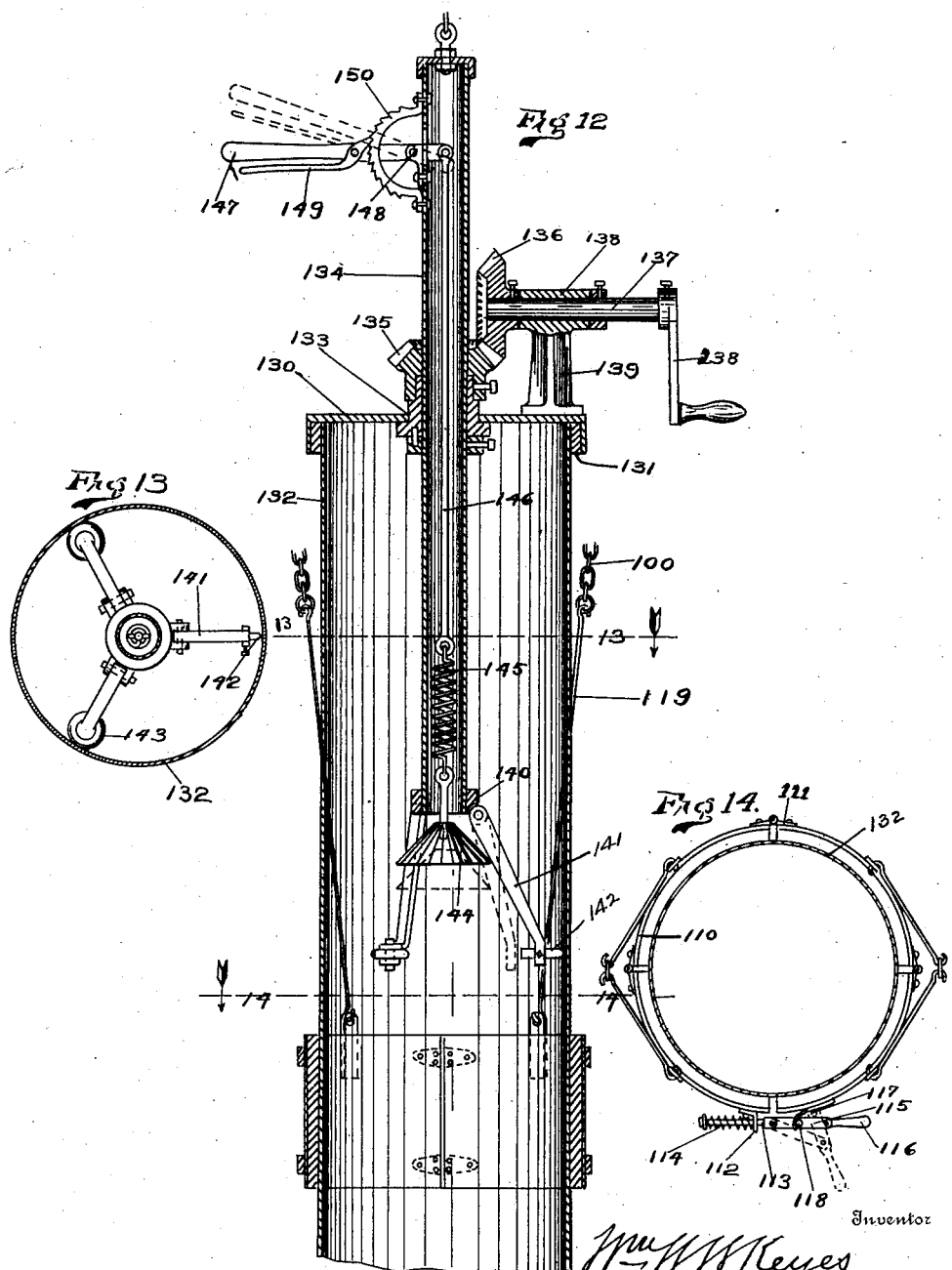

UNITED STATES PATENT OFFICE.

WILLIAM W. W. KEYES, OF ALEXANDRIA, INDIANA, ASSIGNOR OF ONE-FOURTH TO GILFORD B. ROBERTS AND ONE-FOURTH TO JOHN F. MERKER, OF ALEXANDRIA, INDIANA.

MACHINE FOR MAKING WINDOW OR PLATE GLASS.

No. 846,316.     Specification of Letters Patent.     Patented March 5, 1907.

Application filed August 24, 1903. Renewed June 21, 1906. Serial No. 322,700.

*To all whom it may concern:*

Be it known that I, WILLIAM W. W. KEYES, of Alexandria, county of Madison, and State of Indiana, have invented a certain new and useful Machine for Making Window or Plate Glass; and I do hereby declare that the following is a full, clear, and exact description thereof, reference being had to the accompanying drawings, in which like letters refer to like parts.

The object of this invention is to form window, plate, or other sheet glass by drawing the sheet from the body of molten glass, as distinguished from the blowing process, whether the latter be by individuals or by the recently-invented blowing-machines.

In the machine herein set forth there is no blowing of the glass, but the glass is drawn vertically from the surface of the body of molten glass.

In carrying out this invention a metal drawing-ring or equivalent means is caused to descend, after being heated, into contact with the surface of the glass. The glass adheres to the drawing-ring, and as the latter is slowly elevated it draws up with it a cylinder of glass, which after it has become hardened sufficiently is cut into sections of the desired length and placed on trucks and sent to the annealing-oven.

To obtain a quality of molten glass possessing the right temperature for drawing, a supplemental tank is added to the side of the main glass-tank and in communication therewith. In the supplemental tank there is no heating means; but, on the contrary, there is preferably means for shutting out the heat from the main tank and also means for cooling or controlling the temperature of the glass in the supplemental tank in order that its temperature may be reduced. The drawing-ring above referred to is preferably heated to almost the same temperature as the glass at the surface of the supplemental tank.

While the drawing-ring will elevate and form the cylinder of glass without other means, the glass will be very thin. To thicken the cylinder of glass while being drawn and give it the desired strength, means for chilling the surface of the body of glass in the supplemental tank at and near the point from which the cylinder of glass is being drawn is provided. Herein said means consists of coils of pipe within and without the lower end of the cylinder of glass as it is being drawn, and through said pipes cold water is introduced. Means is provided for regulating the temperature of said coils near the surface of the body of glass. The chilling of the surface of the body of glass at this point causes more of it to be drawn upward into the cylinder of glass and gives to it thickness and strength that may be modified, if desired.

The drawing-ring above described need be used only for starting the formation of the cylinder of glass, for after the cylinder of glass has been elevated some distance it may be taken hold of by some other means, such as a ring clamping around the body of the cylinder of glass, and the drawing-ring first used may be laid aside. Therefore the cylinder of glass is continuously drawn upward by said clamping-rings and the upper end of the cylinder of glass may be cut away as it moves upward and the sections be taken to the annealing-oven. The drawing-ring is not used again until after there has been an entire cessation of the operation just described, which operation may be continued for a long period of time. During all of the operation after the cylinder of glass has been started the cylinder of glass of its own accord draws up the glass from the body of molten glass in the supplemental tank and continuously forms itself. When a new operation of the glass-making apparatus is commenced, the drawing-ring is used to start the cylinder of glass. The means for carrying out the objects and features specified constitute the main body of my invention. Means is also provided for cutting off the cylinder of glass on the inside when desired. Such cutting means is elevated and lowered into the cylinder of glass or lifted out of it, as occasion requires. These and the various other details of this invention will appear from the accompanying drawings and the following description and claims.

In the drawings, Figure 1 is a horizontal section of a portion of the main tank with the supplemental tank added thereto and the track and tower on each side of the supplemental tank, parts being broken away. Fig. 2 is a section on the line 2 2 of Fig. 1, showing a damper, part being broken away. Fig. 3 is a vertical central section of a portion of the upper part of the supplemental tank and the means for chilling and drawing the glass therefrom, shown on an enlarged scale, parts being broken away. Fig. 4 is a central vertical section through the supplemental tank and the lower half of the tower about the same and the parts therein mounted. Fig. 5 is the same section of the upper half of the tower. Fig. 6 is a plan view of the means for supporting and adjusting the clay ring in the mouth of the supplemental tank. Fig. 7 is a central vertical section of what is shown in Fig. 6. Fig. 8 is a plan view of the top of the tower, one corner being broken away. Fig. 9 is a vertical section on the line 9 9 of Fig. 8 and of the drawing-ring supported thereby and a cylinder of glass supported by the drawing-ring, parts being broken away and the means for cutting off the glass being shown in dotted lines. Fig. 10 is a plan view of a portion of the drawing-ring with one of the supporting-rods in cross-section. Fig. 11 shows an elevation of what appears in Fig. 10. Fig. 12 is a central vertical section of a portion of the cylinder of glass and the means for holding the same after it has been cut off and for cutting the same to separate it from the main body of the glass. Fig. 13 is a section on the line 13 13 of Fig. 12. Fig. 14 is a transverse section on the line 14 14 of Fig. 12, but showing the links for supporting the glass-holder, which extends above said section-line. Fig. 15 is a side elevation of one of the cooling-coils and the means for supporting and vertically adjusting the same.

In detail, there is added to one side of an ordinary glass-tank 20 a supplemental tank 21, connected with the main tank by two openings 22, passing one on each side of a central wall portion 23, as appears in Fig. 1. The result is that the molten glass flows into and fills the supplemental tank in the same way and to the same level as the main tank. The purpose of the supplemental tank is to enable the glass to be retained therein at a lower temperature than in the main tank, so that it can be worked or drawn. The reduction in temperature of the glass in the supplemental tank results not only from said tank being separated from the main tank, and therefore out of direct contact with it and the influence of the fire, but also by the dampers 24, that are mounted in the wall of the supplemental tank and the middle wall-piece 23, so as to extend across the passage-way 22 and be vertically slidable. This appears in Figs. 1 and 2, and said dampers are supported by cables 25, extending over sheaves 26, mounted on the front face of the wall of the main tank and carrying weights 27. The dampers 24 preferably extend down to the surface of the glass 28 in the supplemental tank and shut the heat from the main tank out of the supplementary tank. If, however, it is desired to increase the temperature in the supplementary tank for any reason, said dampers may be elevated to any desired extent.

Further details of construction of the supplemental tank will appear in Fig. 4, where an oval top is shown with a central opening or mouth. There is also a series of flues 30 leading from said tank and closed near their upper ends by dampers 31, whereby they may not only be closed, but the extent of the opening adjusted. These flues are shown in cross-section in Fig. 1 and are to be used for keeping the glass in the supplemental tank at the proper temperature for working. The bottom of the tank is flat with a spreader 32, in the form of a frustum of a cone, extending up level with the flues 30, as shown in Fig. 4. This spreader is preferably formed of clay and of one piece for the purpose of keeping the lower end of the glass cylinder spread as it is being drawn and of furnishing a conduit 33, in the center thereof, for the inlet water-pipe 34 and the outlet water-pipe 35, which are connected by the coil 37. A guide 36 is placed in the conduit 33 to hold the pipes 34 and 35 in place, and especially to hold the coil 37 from shaking and in the proper place. This guide 36 is merely a cylindrical block with holes through it for the pipes. The block 36 is tightly mounted on the pipes 34 and 35, so that when said block is moved by the rod 40 and lever 41 the spiral 37 above can be elevated or lowered somewhat, so as to adjust the lower end thereof to the desired position for chilling the glass. The lever 41 is fulcrumed on the bearing-piece 42. The pipe 34 leads from any suitable water-supply. The spiral 37 is somewhat conical in form, as shown, with the lower end in close proximity to the upper end of the clay spreader 32 and of slightly larger diameter, so that it will cool the atmosphere, and thereby the glass, in its vicinity.

Within the mouth of the supplemental tank there is a clay cylinder 44, vertically movable, so that the lower end thereof will extend down into the body of the glass. The construction of this cylinder is shown best in Fig. 7. There is a top plate 45 with lateral flanges overlapping the top of the clay cylinder, and to this there are secured a number of metal straps 46, that extend to the lower end of the clay cylinder and have bolts 47 extending from said straps into the body of the clay cylinder to preserve its shape and form. The means for supporting and adjusting this cylinder are shown in Figs. 6 and 7. It is done by some screw-rods 48, that extend up through guide-brackets 49, secured to the diagonal bars 50, that are fastened to the I-beams 51, mounted on the I-beams 52, that are supported at one end on the posts 53 and at the other end on the cross I-beam 54, that rests at each end upon the posts 55, that are built against the side of the main tank. A spiral gear 57 surrounds each threaded rod 48 and rests upon the bracket 49 and meshes with and is actuated by a corresponding spiral gear 58, mounted loosely on the shaft 59, that is mounted in the bearings 60, secured upon the top of the bars 50. There are two shafts 59, which carry sprocket-wheels 61, over which a chain 62 moves, and the shafts are provided also with cranks 63, so that the movement of one crank will cause a similar movement of the other. A clutch-jaw 64 is secured on the outer side of each spiral gear 58, that is adapted to be engaged by a corresponding clutch-jaw 65, secured on the rod 59. The rods 59, are longitudinally movable in their bearings, and the clutch members 65 are so placed with relation to each other that at least one of them will always be in engagement with the spiral gear when the rod 59 is pushed to its extreme limit in either direction; but if it be moved so that one of said clutch members 65 will be partially in engagement the other clutch member 65 will be similarly engaged and the shaft 59 will actuate both spiral gears 58, mounted on it, thus giving the operator control of the means for elevating the clay cylinder. He can operate either the left-hand or right-hand pair of spiral gears 58, or all four, as desired, or three of the spiral gears 58 may be thrown out of operation.

To further control the mechanism after adjusting the clay cylinder so that any side of it or any portion of it can be elevated or lowered, as the condition of the glass may require, there is provided clutches 66 on the outer faces of the sprocket-wheels 61 to engage corresponding clutch members on the outer ends of the shafts 59, so that said shafts 59 or either of them can be thrown out of gear with the sprocket-wheels 61 or either of them.

The function of the mechanism last described is to vertically adjust the position of the clay cylinder to suit the condition of that glass with which it is in contact. If there is a difference in temperature of the glass on one side or at one point of the clay cylinder, it can be raised or lowered, so as to counteract the effect of the difference in temperature. If the glass at one side is hotter than at the other side, the clay cylinder at the hot side is lowered somewhat, so that when the glass comes under that side of the cylinder to the drawing position it will be of the same temperature as the rest of the glass at the drawing position. The main function of the clay cylinder is to form within it what might be called a "chamber" for drawing the glass and to keep the heat away from said drawing-chamber. The glass is drawn up under said clay cylinder, as will be hereafter explained.

The cylinder of glass is drawn by the ring 65, as seen in Fig. 3. This ring is of greater diameter than the apex of the pyramid 32 and of the middle chilling-coil 37 and surrounds them at the beginning of the drawing process. The drawing is effected by contact of the glass with the ring, so that the glass will adhere to the ring, the ring at the time being at a rather high temperature, so that its color is a cherry-red. When the ring is dropped down to the glass, it should be of such temperature as to cause the glass to adhere to it. The ring is then slowly elevated, and as it is elevated it draws a cylinder of the glass up with it. The metal ring continues to draw up the cylinder of glass even after it has been elevated to considerable distance above the surface of the main body of glass, because of the apex of the spreader being inside of the circular portion of the glass that is being drawn up from the body of the glass. In other words, the spreader causes the lower end of the cylinder of glass that is being drawn upward to maintain substantially the same diameter as the drawing-ring instead of tapering to a point, as would be the case if the spreader were not there. In order that the sheet of glass may be made thick enough, cooling-coils are provided, as shown in Fig. 3, the one, 37, within the cylinder of glass as it is formed and another, 67, surrounding the same, the latter being formed of water-pipes like the former. Said coil 67 is supplied with water through an inlet-pipe 68, that runs out through an outlet-pipe 69. As appears in Fig. 3, the lower end of the outer coil 67 chills the surface of the glass outside of the drawing-ring 65 or of the cylinder of glass after the drawing-ring has been elevated. while the lower end of the coil 37 chills the surface of the glass within said ring or cylinder of glass. By increasing the chill the cylinder of glass drawn will be correspondingly thicker, and the opposite result follows from decreasing the chill. The temperature of the inner coil is regulated by controlling the flow of water by the valves 70 and 71, and the water in the outer coil is regulated by the valves 72 and 73. With these valves not only can the amount of water admitted be controlled, but the direction of flow of the current can be changed, so that instead of cold water entering the upper end of the inner coil it would enter the lower end and more quickly and directly chill the glass, if desired.

On each side of the supplemental tank there is a railway-rail 75, and these rails form a track for supporting the tower. Said tower is carried by the wheels 76 and is formed of four latticed columns 77, one at each corner of the rectangle, and they approach each other more at the top, so as to be somewhat tapering as shown. They are held together by the beams 78 and braces 79 and tie-rods 80. The construction of the top of this tower appears in Fig. 8, there being four side beams 81 and an intermediate beam 82, two cross-beams 83, running from one of the side beams 81 to said intermediate beam, and a beam 84, connecting the two cross-beams 83. Another cross-beam 85 extends from the intermediate beam 82 over and beyond one of the outer beams 81. A bent beam 86 extends from one of the cross-beams 81 to the adjacent cross-beam 81. On these various beams there are mounted two shafts 87 and 88 at a right angle to each other, a bevel-gear 89 on one end of the shaft 88 meshing with a similar gear 90 on the shaft 87, and the shaft 87 is driven by the gear 91, pinion 92 on the shaft 93, gear 94, and pinion 95, mounted on the shaft of the motor 96, that is secured to one of the beams 81.

On the shafts 87 and 88 there are mounted chain-drums 97, and on one end of each of said drums there is a friction-clutch 98, that is controlled by a hand-lever 99. With this arrangement said drums are independently controlled, so that one can be operated while the other is not being operated. The function of this mechanism is to adjust, control, and elevate the drawing-ring 65. This is done by means of the chains 100, that run from the drums over sheaves 101, that are mounted on the shafts 102. At the lower end of the chains from one of said drums there are rods or long links 103, that are at their lower ends connected to vertical rods 104, which are at their lower ends connected with the drawing-ring 65 in the manner shown in Figs. 10 and 11. The upper ends of the rod 104 are held in their relative positions by a ring 105.

In Fig. 9 the drawing-ring 65 is shown at the upper end of the long cylinder of glass which it has drawn up and which ring is ready to be removed. I do not wish to be limited to the arrangement shown in Fig. 8 for controlling the clutches that move the drums, as that is merely to explain the general idea so far as that part of the mechanism is concerned, and it may be altered to render the operation of said machinery more convenient than in the form shown. After the cylinder of glass has been drawn upward from the position shown in Fig. 3 sufficiently far to become hardened it is clamped below the drawing-ring by a clamp 110, like that shown in Figs. 12 and 14. This clamp is formed of four equal sections with their ends successively abutting, and at their joints there are hinges 111, while at the fourth joint the sections or ends of the ring are drawn together by the means shown in Fig. 14. On the end of one section there is a bracket 112, through which a rod 113 loosely extends that carries on one end a spring 114 and at the other end a bar 115, pivoted thereto. A handle 116 is pivoted between its ends to the outer end of the bar. The pin 117 on the inner end of the handle engages a catch 118 on the other section and draws the two sections together when the handle 116 and the bar 115 are in alinement, but when they are not in alinement, as shown in the dotted lines in Fig. 14, the catch 118, and consequently the sections of the ring, will be released, and the ring can be readily opened and placed about a cylinder of glass as shown in Fig. 12. It is supported by links 119, similar to the links 103, and these links are supported by the chains 100. After the cylinder of glass has been caught by the clamp 110 the drawing-ring 65 may be removed. This is done by cutting away the cylinder of glass just below the drawing-ring and disengaging the links 103 of the drawing-ring from the chains. The cylinder of glass is then further elevated by one of the drums 97 until it extends above the platform 120 on the beams 121, that are reinforced by the braces 122, as appears in Fig. 5. Trucks 123 operate on this platform for removing the glass. This is accomplished by cutting off sections of the glass—say five feet in length—and removing said sections by said trucks. The cylinder of glass is continuously elevated after it has been started, as described, without the further use of the drawing-ring, by means of the clamping-rings 110. Since there are two drums 97 and two sets of links 103, two of said clamping-rings may be used, as shown in Fig. 5, and while one ring is raising the cylinder of glass at the upper end the other can be placed around it below, so that at all times the cylinder of glass is supported and being elevated by at least one of said clamping-rings.

The means for cutting off the cylinder of glass will now be explained. It is shown in Fig. 12 and consists of a cap 130 lined with asbestos or other soft material 131, so that it may rest loosely upon the cylinder of glass 132, as shown in said figure. It has secured centrally in it a collar 133, through which a tube 134 extends vertically. This tube has secured on it a bevel-gear 135, that meshes with the bevel-gear 136 on the shaft 137, mounted in the bearing 138 on the post 139 on said cap. The shaft 137 is operated by the handle 238. By this means said shaft 134 is rotated. It carries on its lower end a collar 140 with three arms 141, pivoted thereto, one of said arms carrying on its lower end a diamond 142, and the others carrying guides 143. These are spread by a spreading-block 144, that is elevated by a spring 145 and the connecting-rod 146 within the tube 134 and a hand-lever 147, fulcrumed at 148 and held in place by the pawl 149, that engages the curved rack 150, secured to said tube 134. In full lines in Fig. 12 the arms 141 are spread, so that the diamond will cut the cylinder of glass when revolved.

The inoperative position of said parts is shown by dotted lines in said figure. Said cutting means is shown in dotted lines in Fig. 9, and the means for elevating and lowering the same appears in that figure. It consists of the detachable chain 151, that extends over sheaves 152, mounted in brackets 153 on the under side of the beam 154, secured below the beams 81. A weight 155 is secured to the other end of said chain 151. This enables the operator to elevate or lower the cutter into the desired position, and then he spreads the arms 141 by means of the lever 147 and rotates the crank 238 and the diamond and cuts the glass. He then releases the lever 147, elevates his cutter, and removes his cylinder of glass and places it upon one of the trucks.

The clay cylinder 44 is elevated entirely out of the supplemental tank when desired by means of the chains 100; the hooks of the chains being caught in the eyes 150 in the bearers 51. (Seen in Fig. 6.) The outer coil and its supporting means is similarly elevated when necessary. Said outer coil is supported and adjusted vertically by means (seen in Fig. 15) which is exactly the same as shown in Figs. 6 and 7 for supporting and adjusting the clay cylinder, excepting that said means is slightly smaller and it is mounted on the lower I-beams 78 of the tower slightly above the means shown in Fig. 6 for supporting the clay cylinder.

What I claim as my invention, and desire to secure by Letters Patent, is—

1. In a machine for making sheet or plate glass, an open drawing-ring, and means for elevating it from contact with the body of molten glass out of which the sheet or plate glass is to be formed.

2. In a machine for making sheet or plate glass, a tank for the molten glass, a spreader extending above the surface of the glass and surrounded by the glass, an open drawing-ring, and means for lowering the drawing-ring to the surface of the glass surrounding said spreader and then for elevating said ring.

3. In a machine for making sheet or plate glass, a tank for the molten glass, a spreader located in said tank and extending above the surface of the glass therein, an open ring for drawing a cylinder of glass upward from the molten glass about said spreader, means for chilling the surface of the molten glass near the point from which the cylinder is being drawn, and means for regulating the chill imparted thereby to the glass.

4. In a machine for making sheet or plate glass, a tank for the molten glass, an open drawing-ring, means for lowering said drawing-ring to the molten glass and elevating the same therefrom, and stationary means for chilling the cylinder of glass that is located within the path of the ring.

5. In a machine for making sheet or plate glass, a tank for the molten glass, a stationary receptacle for a chilling fluid located above the molten glass, an open drawing-ring of larger diameter than said receptacle, and means for lowering said ring about said receptacle and into contact with the molten glass and elevating the same.

6. In a machine for making sheet or plate glass, a drawing-ring, means for lowering it into contact with the surface of the molten glass and slowly elevating it so as to draw a cylinder of glass from the molten glass, a coil of chilling pipes located so as to be within the cylinder of glass, and another coil of chilling pipes located to surround the cylinder of glass, said coils extending upward from a point immediately above the body of molten glass.

7. In a machine for making sheet or plate glass, means for starting the withdrawal of a cylinder of glass from the surface of a body of molten glass, and a circular clamp surrounding the cylinder and clamping it below the top thereof and continuously elevating the same after it has been started.

8. In a machine for making sheet or plate glass, means for holding the cylinder of glass below the top thereof and continuously elevating the same after it has been started, and means for cutting said cylinder of glass into sections after it has been sufficiently hardened and while it is being elevated.

9. In a machine for making sheet or plate glass, a tank for molten glass having an opening through its top, a spreader within said tank extending from the bottom to a point above the surface of the glass, a cylinder extending downward through an opening in said tank to a point below the surface of the glass and surrounding the upper end of said spreader, and means for operating on the glass within said cylinder near the upper end of said spreader.

10. In a machine for making sheet or plate glass, a tank for the molten glass, a spreader extending up in said tank to a point above the surface of the glass, an inner chilling-coil mounted at the top of said spreader, means for drawing the glass from a line surrounding the top of said spreader, and an outer chilling-coil around the cylinder of glass being drawn, the lower end of said outer coil surrounding the upper end of said spreader.

11. In a machine for making sheet or plate glass, a tank for the molten glass, a spreader in said tank extending above the surface of the glass, a coil of pipe mounted on the upper end of said spreader with outlet and inlet pipes to said coil through said spreader, and means for vertically adjusting the position of said coil.

12. In a machine for making sheet or plate glass, a tank for the molten glass, a spreader in said tank extending above the surface of the glass, a coil of pipe mounted on the upper end of said spreader with outlet and inlet pipes to said coil through said spreader, valves in said pipes for controlling the flow of water through said coil, another coil of pipes, means for supporting it about said central coil, valve-controlled pipes leading to said outer coil, and means for drawing a cylinder of glass from the surface of the molten glass between said coils.

13. In a machine for making sheet or plate glass, a tank for the molten glass, a tower above the same, means for starting the formation of a cylinder of glass, means for clamping the cylinder of glass after it is started, a plurality of means on the top of the tower for elevating said starting and said clamping means, and means for operating said elevating means together or independently of each other.

14. In a machine for making sheet or plate glass, a tank for the molten glass, a tower above the same, two drums mounted on said tower, shafts on which said drums are mounted, means for driving the same, clutches on each shaft for transmitting power from the shaft to the drum thereon, means for operating each of said clutches independently, chains on each drum, a pair of pulleys mounted on the tower over which said chains pass so as to bring the chains of each pair opposite each other, and means for operating on the glass in and above the tank that may be connected or disconnected at will with said chains.

15. In a machine for making sheet or plate glass, a tank for the molten glass, a drawing-ring for starting a cylinder of glass upward from the surface of the molten glass, a plurality of rods extending upward from said ring, a ring at the upper end of said rods for holding their free ends in place, and means for elevating or lowering the frame thus formed in connection with said drawing-ring.

16. In a machine for making sheet or plate glass, a tank for the molten glass, means for starting a cylinder of glass upward from the surface of the molten glass, a clamping-ring for engaging and holding said cylinder of glass after it has been started, said clamping-ring consisting of a plurality of sections hinged together at all their adjacent ends save one so as to form a separable ring, and means for drawing and holding the ends of said ring together.

17. In a machine for making sheet or plate glass, a tank for the molten glass, means for starting a cylinder of glass upward from the surface of the molten glass, a clamping-ring for engaging and holding said cylinder of glass after it has been started, said clamping-ring consisting of a plurality of sections hinged together at all their adjacent ends save one so as to form a separable ring, a bracket secured to one end of said ring, a spring-catch secured to the other end, a spring-controlled rod extending loosely through said bracket, a bar pivoted to the inner end of said rod, and a handle pivoted between its ends to the outer end of said bar with a pin on the inner end of said handle to engage said catch, substantially as shown and described.

18. In a machine for making sheet or plate glass, a tank for the molten glass with an opening in the top thereof, a cylinder running through said opening with its lower end below the surface of the glass, four rods extending upward from said cylinder and equidistant from each other, and supporting said rods and means for independently elevating or lowering each of said rods so as to adjust the vertical position of said cylinder or any portion thereof.

19. In a machine for making sheet or plate glass, a tank for the molten glass having an opening in the top, a cylinder extending downward into said opening with its lower end below the surface of the glass, screw-rods extending upward from said cylinder, a frame above said tank, brackets mounted on said frame through which said screw-rods extend, a spiral gear internally threaded and mounted on each of said rods above said bracket, horizontally-disposed shafts, gears on said shafts for actuating the spiral gears on said threaded rods, clutches on said shafts for engaging or disengaging said gears, and means for actuating said shafts separately or together, as desired.

20. In a machine for making sheet or plate glass, a tank for the molten glass, means for drawing a cylinder of glass upward from the surface thereof, a cutter operative within the cylinder of glass, and means for lowering said cutter into the upper end of the cylinder of glass whereby the upper portion thereof may be cut off.

21. In a machine for making sheet or plate glass, a tank for the molten glass, means for continuously drawing a cylinder of glass upward from the surface of the molten glass, a cap adapted to fit upon the upper end of the cylinder of glass, a cutter mounted in connection with said cap and adapted to enter the cylinder of glass, means on said cap for operating the cutter, and means for elevating and lowering said cap.

22. In a machine for making sheet or plate glass, a tank for the molten glass, means for drawing a cylinder of glass upward from the surface thereof, a cap-plate adapted to be placed upon and surround the upper end of the cylinder of glass, a tube extending centrally through said cap, arms pivoted to the lower end of said tube, guide-rollers on the lower end of two of said arms, a diamond on the lower end of one arm, a block for spreading said arms, means operative through said tube for moving said block to spread said arms, a bevel-gear on said tube above said cap, and means mounted on the cap for actuating said bevel-gear to revolve the tube and diamond.

23. In a machine for making sheet or plate glass, a tank containing molten glass, means for drawing a cylinder of glass upward from the surface thereof, a platform mounted above said tank through which said cylinder of glass is elevated, means for cutting off sections of said cylinder of glass above said platform, and trucks on said platform for moving the sections of glass as they are cut.

In witness whereof I have hereunto affixed my signature in the presence of the witnesses herein named.

WILLIAM W. W. KEYES.

Witnesses:
V. H. LOCKWOOD,
NELLIE ALLEMONG.